United States Patent
Moon et al.

(10) Patent No.: US 6,769,264 B2
(45) Date of Patent: Aug. 3, 2004

(54) CONTROL SYSTEM OF DEGREE OF SUPERHEAT OF AIR CONDITIONER AND CONTROL METHOD THEREOF

(75) Inventors: Joong-Ki Moon, Seoul (KR); Young-Man Kim, Seoul (KR); Jae-Myoung Moon, Suwon (KR); Jung-Min Lee, Suwon (KR); Jong-Youb Kim, Suwon (KR); Il-Yong Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/019,534

(22) PCT Filed: Jan. 5, 2001

(86) PCT No.: PCT/KR01/00018

§ 371 (c)(1),
(2), (4) Date: Jan. 3, 2002

(87) PCT Pub. No.: WO01/94855

PCT Pub. Date: Dec. 13, 2001

(65) Prior Publication Data

US 2003/0070441 A1 Apr. 17, 2003

(30) Foreign Application Priority Data

Jun. 7, 2000 (KR) .......................................... 2000-31147
Dec. 30, 2000 (KR) .......................................... 2000-86776

(51) Int. Cl.$^7$ .......................... F25B 49/00; F25B 41/04
(52) U.S. Cl. .......................... 62/204; 62/212; 62/228.5
(58) Field of Search .......................... 62/204, 212, 225, 62/228.5

(56) References Cited

U.S. PATENT DOCUMENTS

| | | | | |
|---|---|---|---|---|
| 4,697,431 A | * | 10/1987 | Alsenz | .......................... 62/225 |
| 5,142,879 A | * | 9/1992 | Nakamura et al. | ............ 62/160 |
| 6,047,557 A | * | 4/2000 | Pham et al. | ................ 62/228.5 |

FOREIGN PATENT DOCUMENTS

| | | | |
|---|---|---|---|
| JP | 08-21666 | 1/1996 | ............. F25B/5/02 |
| JP | 8-334094 | 12/1996 | |
| KR | 96-6363 B | 5/1996 | |
| KR | 97-129101 B | 11/1997 | |

\* cited by examiner

*Primary Examiner*—William Wayner
(74) *Attorney, Agent, or Firm*—Staas & Halsey LLP

(57) ABSTRACT

Disclosed herein is a system and method for controlling the degree of superheat of an air conditioner. The air conditioner includes a compressor controlled in a pulse width modulation manner according to duty control signals, a condenser, an electronic expansion valve and an evaporator so as to form a refrigeration cycle. An entrance temperature sensor situated at the entrance of the evaporator and an exit temperature sensor situated at the exit of the evaporator are connected to a control unit. The control unit calculates the degree of superheat of the evaporator using the difference between mean entrance and exit temperatures of the evaporator sensed by the entrance temperature sensor and the exit temperature sensor for a period of time corresponding to a duty cycle period of the compressor, and regulates the opening of the electronic expansion valve according to the calculated degree of superheat.

6 Claims, 9 Drawing Sheets

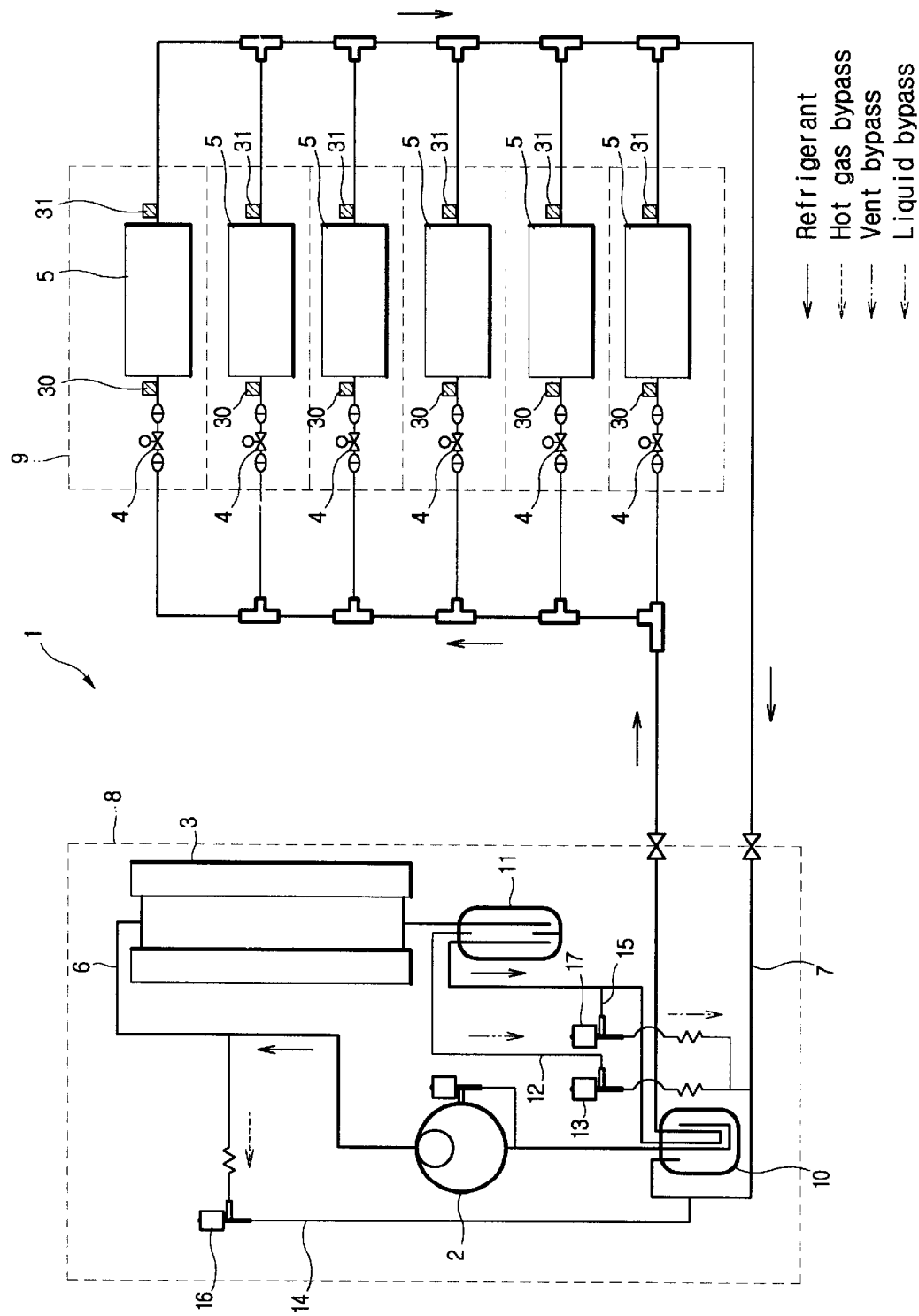

CONTROL SYSTEM OF DEGREE OF SUPERHEAT OF AIR CONDITIONER AND CONTROL METHOD THEREOF

TECHNICAL FIELD

The present invention relates generally to air conditioners, and more particularly to a system and method for controlling the degree of superheat of an air conditioner that employs a pulse width modulated compressor.

BACKGROUND ART

With the enlargement of buildings, there is an increasing consumer demand for a multi-air conditioner in which a plurality of indoor units are connected to a single outdoor unit. In such a multi-air conditioner, the required cooling capacities of the indoor units vary according to change of the environmental characteristics of locations where the indoor units are installed. This requirement is fulfilled by adjusting the openings of electronic expansion valves positioned upstream of an indoor side heat exchangers or evaporators. In particular, in the case of a multi-air conditioner, since the lengths of the refrigerant conduits between its indoor units and outdoor unit are different and therefore refrigerant undergoes different flow resistances, the degrees of superheat of its evaporators (the degree of superheat of each evaporator=the exit temperature of the evaporator–the entrance temperature of the evaporator) are different. In theory, the degree of superheat means the difference between the temperature of superheated vapor and the temperature of saturated vapor. Often, in practice, the difference between the entrance and exit temperatures of an evaporator is regarded as the degree of superheat, and is used to control the degree of superheat.

When the degree of superheat of refrigerant flowing out of an evaporator is high, superheat of a compressor and decrease in efficiency of the compressor are caused. When the degree of superheat is excessively high, a safety device is operated and the entire operation of an air conditioning system is stopped. On the other hand, when the degree of superheat is excessively low, the possibility that liquid refrigerant enters the compressor becomes high.

As a result, it is necessary to properly control the degrees of superheat of indoor side heat exchanges (evaporators) so that the performances of the indoor units are maximized, the difference between the performances of the indoor units are reduced and the efficiency and stability of the compressor and entire system are improved.

In the conventional multi-air conditioner, since a constant speed type or variable rotation number type compressor is employed, the flow rate of refrigerant does not vary largely over time during the operation of the compressor. Accordingly, since the entrance and exit temperatures of the evaporators smoothly vary as shown in FIG. 8, it is not difficult to control the degrees of superheat using the difference between the entrance and exit temperatures detected.

Pulse width modulated compressors are disclosed as another type of variable capacity compressors in e.g., U.S. Pat. No. 6,047,557 and Japanese Unexamined Pat. Publication No. Hei 8-334094. These compressors are utilized in refrigerating systems each having a plurality of freezing compartments or refrigerating compartments, and designed to be applied to short piping in which the length of a refrigerant conduit situated between a compressor and an evaporator is short. Consequently, these compressors cannot be applied to air conditioning systems for buildings that necessarily employ long piping and are given control environments different from those for the refrigerating systems. Further, in the prior art, there is not disclosed a control system and method for utilizing a pulse width modulated compressor in an air conditioner, particularly, in a multi-air conditioner, and in particular a method for controlling the degree of superheat.

When a pulse width modulated compressor is utilized in an air conditioner, the flow of refrigerant is periodically started and stopped because of a loading time, during which refrigerant is discharged, and an unloading time, during which refrigerant is not discharged, are periodically repeated even while the compressor is operated. Accordingly, an air conditioner employing a pulse width modulated compressor has the characteristic (a temperature fluctuation phenomenon) that the entrance and exit temperatures of the evaporator are varied up and down depending on the presence and absence of the flow of refrigerant. Hence, in an air conditioner employing a pulse width modulated compressor, the degree of superheat of an evaporator cannot be properly calculated by the entrance and exit temperatures of the evaporator detected at a given instance.

DISCLOSURE OF THE INVENTION

Accordingly, the present invention has been made keeping in mind the above problems occurring in the prior art, and an object of the present invention is to provide a system and method for controlling the degree of superheat of an air conditioner employing a pulse width modulated compressor, in which the degrees of superheat of evaporators corresponding to the actual degrees of superheat are calculated by compensating for the fluctuation of the entrance and exit temperatures and electronic expansion valves are controlled on the basis of the calculated degrees of superheat, thereby operating the entire air conditioning system at an optimum state.

In order to accomplish the above object, according to an aspect of the principles the present invention, a system for controlling the degree of superheat of an air conditioner comprises a compressor controlled in a pulse width modulation manner according to duty control signals; a condenser, an electronic expansion valve and an evaporator, constituting a refrigeration cycle, together with said compressor; means for sensing properties for calculating the degree of superheat of said evaporator; and a control unit for regulating opening of said electronic expansion valve according to the calculated degree of superheat.

According to another aspect of the principles of the present invention, a method for controlling the degree of superheat of an air conditioner, said air conditioner including a compressor controlled in a pulse width modulation manner according to duty control signals, an electronic expansion valve and an evaporator, comprising the steps of: detecting entrance and exit temperatures of said evaporator; calculating degree of superheat on the basis of detected entrance and exit temperatures; calculating target opening value of said electronic expansion valve on the basis of the calculated degree of superheat; and regulating said electronic expansion valve to a calculated target opening value.

BRIEF DESCRIPTION OF THE DRAWINGS

FIG. 1 is a diagram showing the cycle of a system for controlling the degree of superheat of an air conditioner in accordance with the present invention;

Figure 2A:
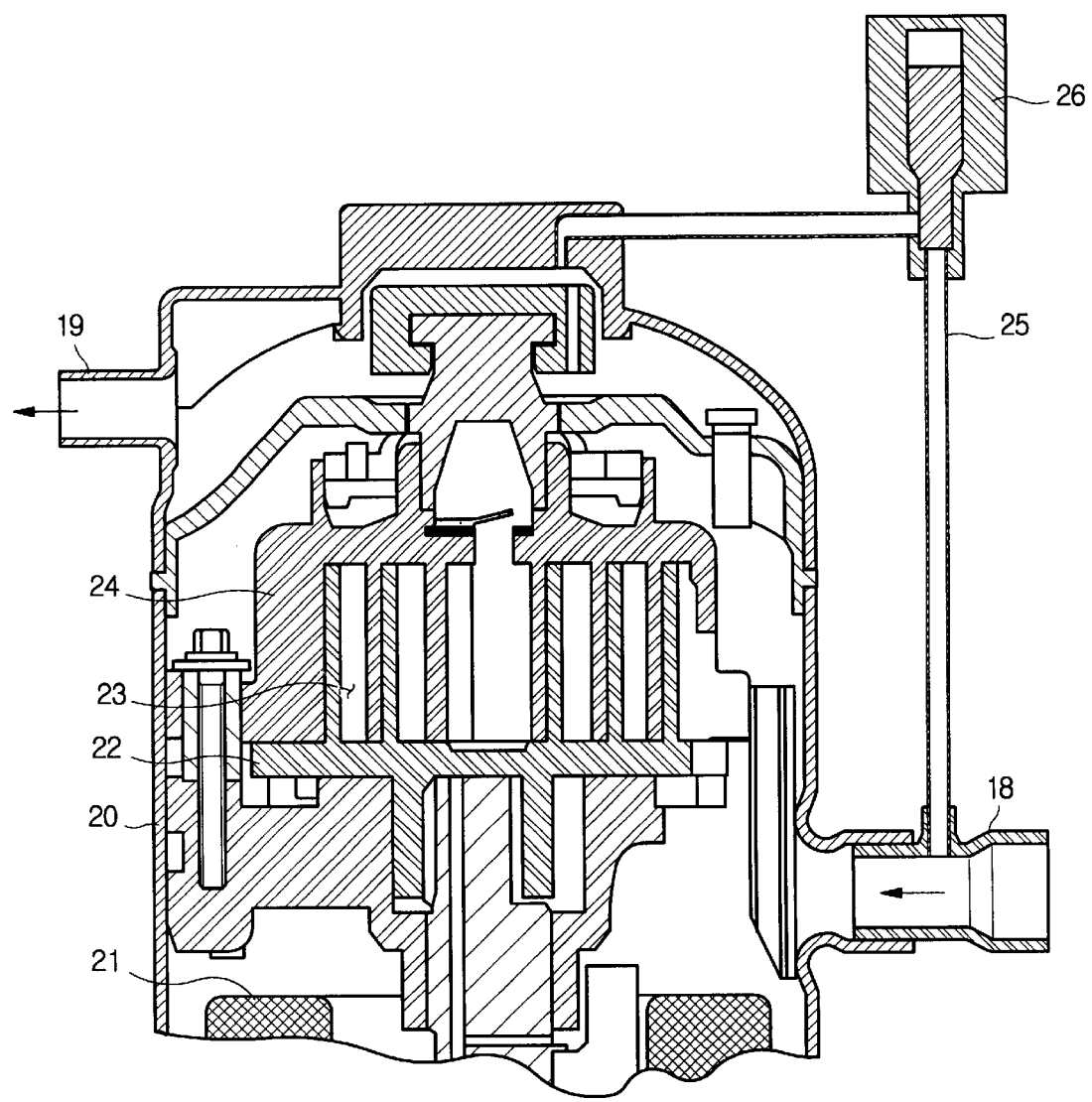
FIG. 2a is a sectional view showing a pulse width modulated compressor at a loading position.

*Description of reference characters of principal parts

2: compressor
5: evaporator
8: outdoor unit
9: indoor unit
26: pulse width modulated valve
27: outdoor control unit
28: outdoor communication circuit unit
29: indoor control unit
30: evaporator entrance temperature sensor
31: evaporator exit temperature sensor

BEST MODE FOR CARRYING OUT THE INVENTION

Hereinafter, embodiments of the present invention are described in detail with reference to accompanying drawings. FIG. 1 is a diagram showing the cycle of a system for controlling the degree of superheat of an air conditioner in accordance with an embodiment of the present invention. The air conditioner 1 includes a compressor 2, a condenser 3, a plurality of electronic expansion valves 4, and a plurality of evaporators 5, which are connected to each other by refrigerant conduits to form a closed refrigerating circuit. Of the refrigerant conduits, a refrigerant conduit connecting the outflow side of the compressor 2 to the inflow side of the electronic expansion valves 4 is a high pressure conduit 6 for guiding the flow of high pressure refrigerant discharged from the compressor 2, while a refrigerant conduit connecting the outflow side of the electronic expansion valves 4 to the inflow side of the compressor 2 is a low pressure conduit 7 for guiding the flow of low pressure refrigerant expanded in the electronic expansion valves 4. The condenser 3 is situated on the high pressure conduit 6, while the evaporators 5 are situated on the low pressure conduit 7. While the compressor 2 is operated, refrigerant flows in solid arrow directions.

The air conditioner 1 includes an outdoor unit 8 and a plurality of indoor units 9. The outdoor unit 8 includes the above described compressor 2 and condenser 3. The outdoor unit 8 further includes an accumulator 10 situated on the low pressure conduit 7 upstream of the compressor 2 and a receiver 11 situated on the high pressure conduit 6 downstream of the condenser 3. The accumulator 10 serves to collect and evaporate liquid refrigerant having not been evaporated and to allow evaporated refrigerant to flow into the compressor 2. If refrigerant is not evaporated completely in the evaporators 5, refrigerant entering the accumulator 10 is a mixture of liquid refrigerant and gaseous refrigerant. The accumulator 10 evaporates liquid refrigerant, and allows only gaseous refrigerant (refrigerant gas) to enter the compressor 2. To this end, it is desirable to situate the entrance and exit ends of the refrigerant conduit situated inside of the accumulator 10 in an upper portion of the accumulator 10.

If refrigerant is not condensed completely in the condenser 3, refrigerant entering the receiver 11 is a mixture of liquid refrigerant and gaseous refrigerant. The receiver 11 is constructed to separate the liquid refrigerant and the gaseous refrigerant from each other and to allow only the liquid refrigerant to be discharged. To this end, the entrance and exit ends of the refrigerant conduit situated inside of the receiver 11 are extended to the lower portion of the receiver 11.

In order to bypass gaseous refrigerant collected in the receiver 11, a vent bypass conduit 12 is provided to connect the receiver 11 to the low pressure conduit 7 upstream of the accumulator 10. The entrance end of the vent bypass conduit 12 is situated in an upper portion of the receiver 11, so only gaseous refrigerant enters the vent bypass conduit 12. A vent valve 13 is provided on the vent bypass conduit 12 and controls the flow rate of gaseous refrigerant bypassed. In FIG. 1, double dotted arrows indicate the flow direction of the gaseous refrigerant.

The portion of the high pressure conduit 6 extended from the receiver 11 is constructed to pass through the accumulator 10. This construction is to evaporate the liquid refrigerant of low temperature collected in the accumulator 10 by using the refrigerant of relatively high temperature passing through the high pressure conduit 6. In order to effectively evaporate the refrigerant, the portion of the low pressure conduit 7 situated in the accumulator 10 is formed in the shape of U, while the portion of the high pressure conduit 6 passing through the accumulator 10 is positioned to pass through the interior of the U-shaped portion of the low pressure conduit 7.

The outdoor unit 8 further includes a hot gas bypass conduit 14 connecting the portion of the high pressure conduit 6 between the compressor 2 and the condenser 3 to the accumulator 10, and a liquid bypass conduit 15 connecting the downstream side of the receiver 11 and the upstream side of the accumulator 10. A hot gas valve 16 is situated on the hot gas bypass conduit 14 to control the flow rate of hot gas bypassed, and a liquid valve 17 is situated on the liquid bypass conduit 15 to control the flow rate of liquid refrigerant bypassed. Accordingly, when the hot gas valve 16 is opened, a portion of hot gas discharged from the compressor 2 flows along the hot gas bypass conduit 14 in the direction indicated by the dotted arrow of FIG. 1. When the liquid valve 17 is opened, a portion of liquid refrigerant discharged from the receiver 11 flows along the liquid bypass conduit 15 in the direction indicated by the double dotted arrow of FIG. 1.

A plurality of indoor units 9 are arranged in parallel. Each of the indoor units 9 includes an electronic expansion valve 4 and an evaporator 5. Consequently, a plurality of indoor units 9 are connected to a single outdoor unit 8. The capacities and shapes of indoor units may be identical with or different from one another.

Meanwhile, a plurality of evaporator entrance temperature sensors 30 are each positioned on the entrance of each evaporator 5 to detect the temperature of refrigerant entering the evaporator 5, and a plurality of evaporator exit temperature sensors 31 are each positioned on the exit of each evaporator 5 to detect the temperature of refrigerant leaving the evaporator 5. These temperature sensors are property sensing means for measuring the degree of superheat of refrigerant, and other sensing means such as pressure sensors may be employed to measure any other property such as pressure.

Figure 2B:
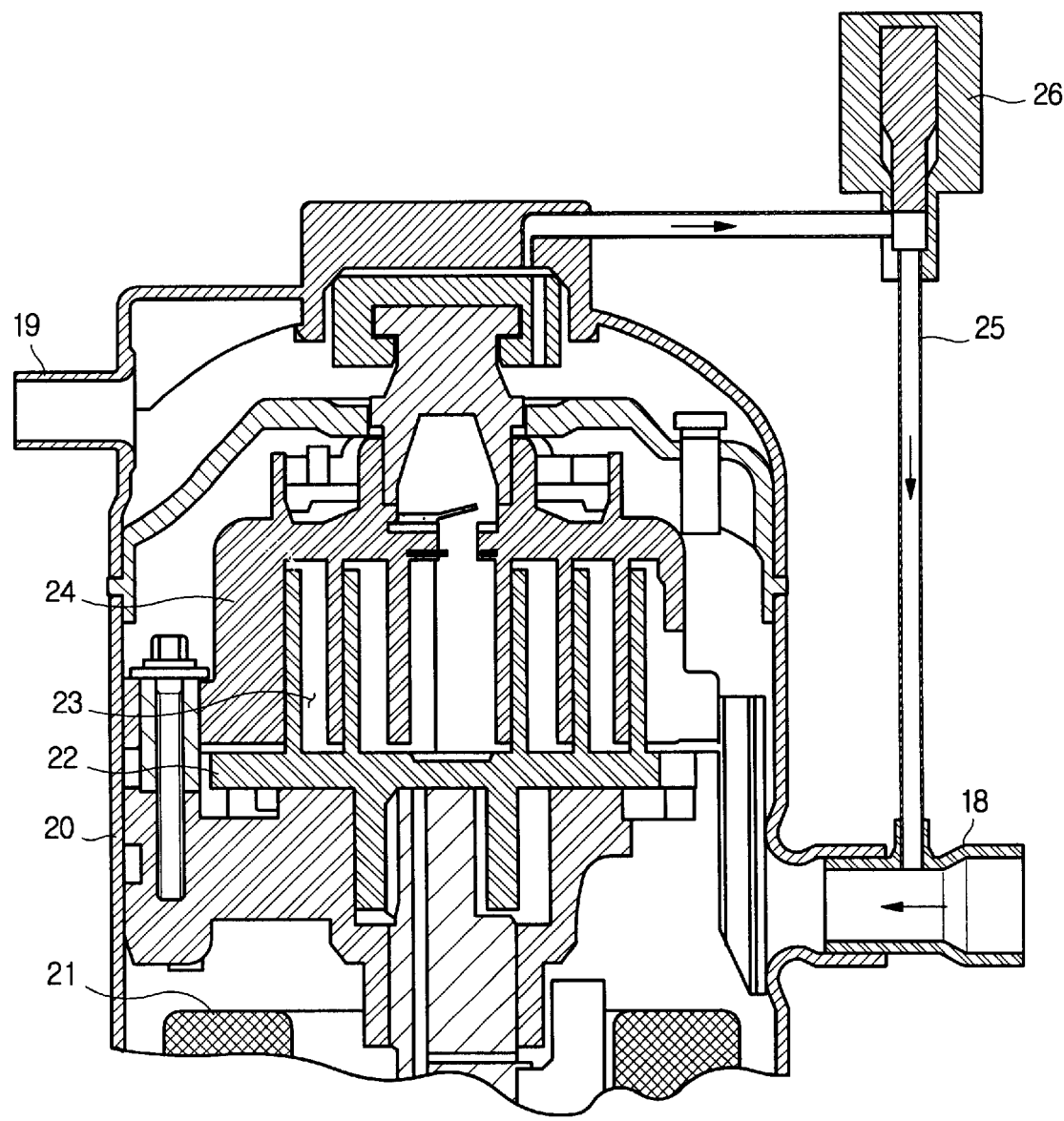
FIG. 2b is a sectional view showing the pulse width modulated compressor at an unloading position.

As depicted in FIGS. 2a and 2b, variable capacity compressors controlled in a pulse width modulation fashion are employed as the compressors 2. Each of the compressors 2 includes a casing 20 provided with an inlet 18 and an outlet 19, a motor 21 situated in the casing 20, a rotating scroll 22 rotated by the rotating force of the motor 21, and a stationary scroll 24 defining a compressing chamber 23 together with the rotating scroll 22. A bypass conduit 25 is attached to the casing 20 to connect a position over the stationary scroll 24 to the inlet 18, and a pulse width modulated (PWM) valve 26 in the form of a solenoid valve is mounted on the bypass conduit 25. In FIG. 2a, the PWM valve 26 is OFF, and the bypass conduit 25 is closed. In this state, the compressor 2 discharges refrigerant. This state is referred to as "a loading state". In the loading state the compressor 2 is operated at 100% capacity In FIG. 2a, the PWM valve 26 is ON, and the bypass conduit 25 is open. In this state, the compressor 2 does not discharge refrigerant. This state is referred to as "a unloading state". In the unloading state the compressor 2 is operated at 0% capacity. Power is supplied to the compressor 2 regardless of the loading and unloading states, and the motor 21 rotates at a constant speed. When power is not supplied to the compressor 2, the motor 21 does not rotate and the compressor 2 is not operating.

Figure 3:
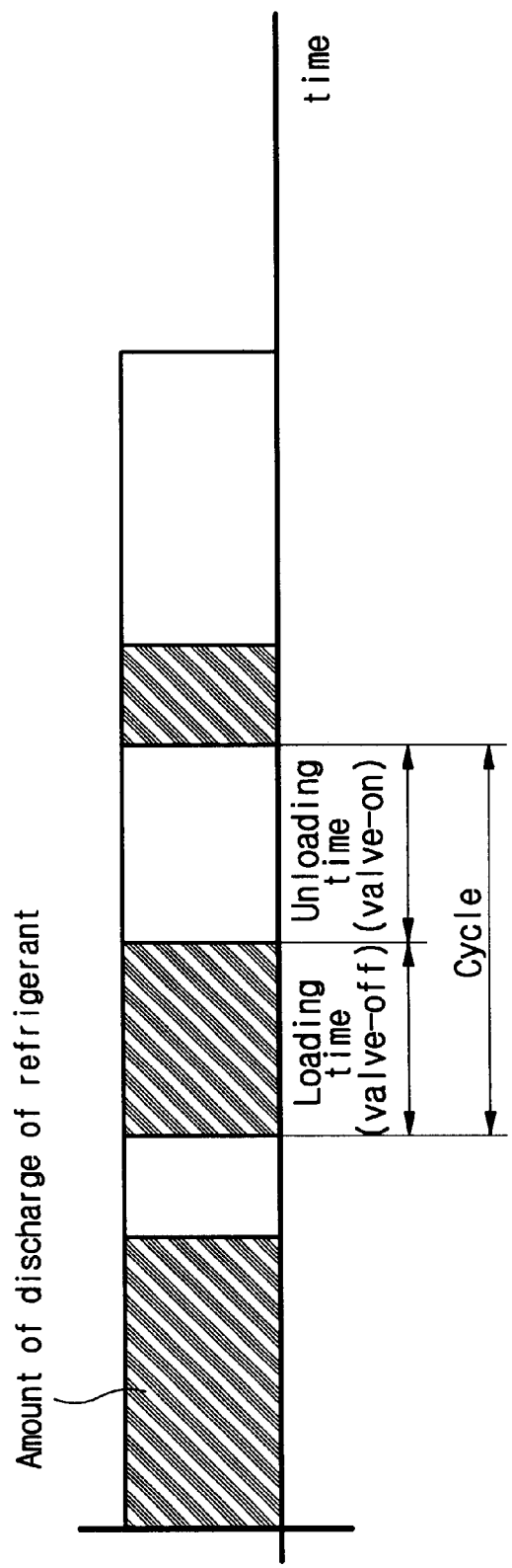
FIG. 3 is a graph showing a relationship among a loading time and an unloading time and the amount of discharged refrigerant during the operation of the compressor of FIGS. 2a and 2b.

As shown in FIG. 3, the compressor 2 periodically undergoes the loading and unloading states during its operation. A loading time and an unloading time vary according to required cooling capacity. The temperature of the evaporator 5 is decreased during the loading time because the compressor 2 discharges refrigerant, while the temperature of the evaporator 5 is increased during the unloading time because the compressor 2 does not discharge refrigerant. In FIG. 3, the hatched portions indicate the amount of discharged refrigerant. Signals for controlling the loading time and the unloading time are referred to as duty control signals. In the embodiments of the present invention, the capacity of the compressor 2 is varied in such a way that the loading time and the unloading time are varied according to the required total cooling capacity of the compressor 2 while each cycle period is kept constant, for example, 20 minutes.

Figure 4:
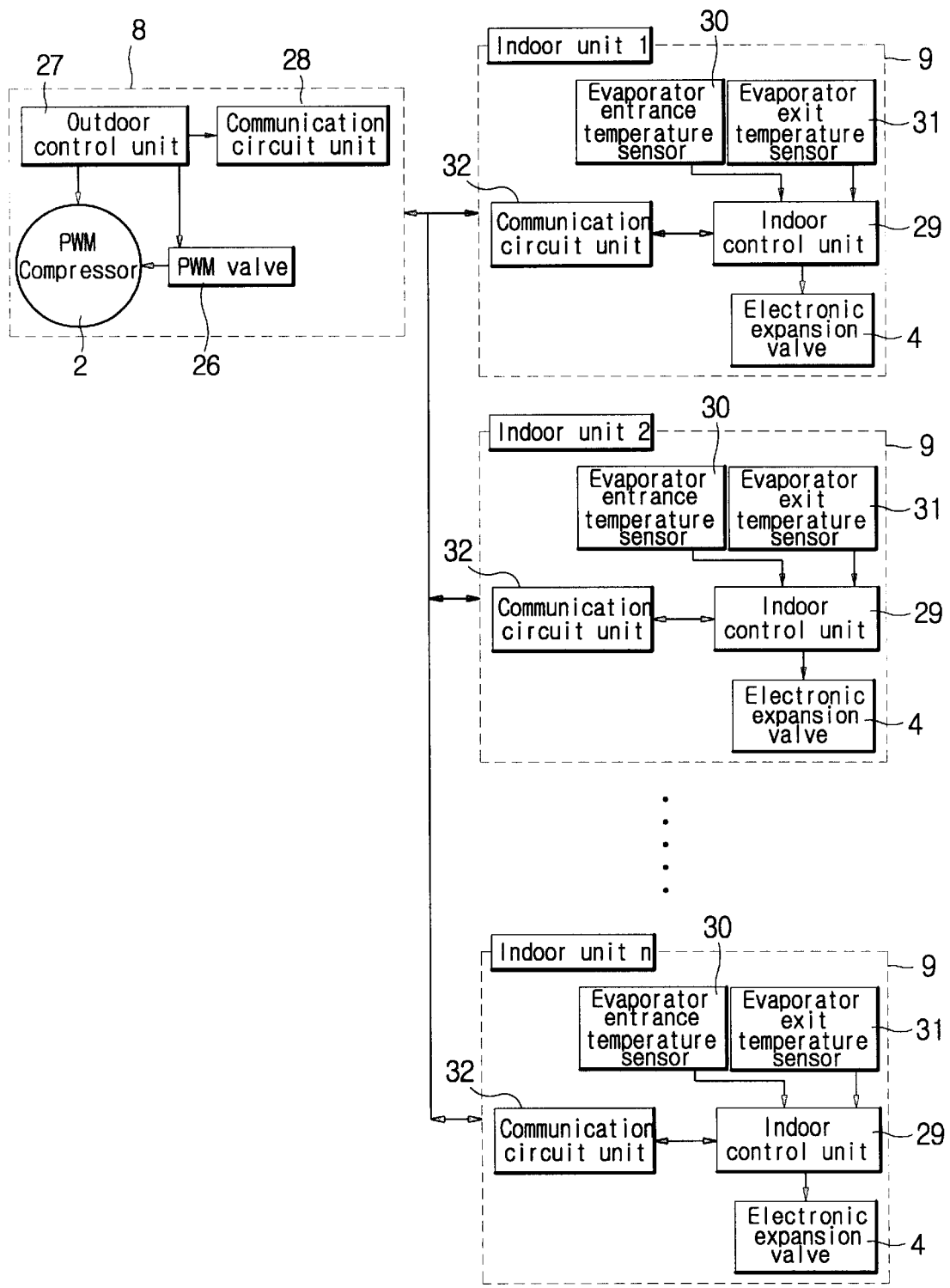
FIG. 4 is a block diagram showing the system for controlling the degree of superheat of an air conditioner in accordance with the present invention.

FIG. 4 is a block diagram showing the system for controlling the degree of superheat of an air conditioner in accordance with the present invention. As illustrated in FIG. 4, the outdoor unit 8 includes an outdoor control unit 27 that is connected to, and controls compressor 2 and the PWM valve 26. The outdoor control unit 27 is connected to an outdoor communication circuit unit 28 to transmit and receive data.

Each of the indoor units 9 includes an indoor communication circuit unit 32, connected to an indoor control unit 29, to transmit and receive data to and from the outdoor unit 8. The outdoor communication circuit unit 28 and the indoor communication circuit unit 32 are constructed to transmit and receive data in a wire or wireless fashion. The evaporator entrance temperature sensor 30 and the evaporator exit temperature sensor 31 are connected to the input port of the indoor control unit 29, and the electronic expansion valve 4 is connected to the output port of the indoor control unit 29. The evaporator entrance temperature sensor 30 detects the temperature of refrigerant entering the evaporator 5 after passing through the electronic expansion valve 4, the evaporator exit temperature sensor 31 detects the temperature of refrigerant having passed through the evaporator 5, and detected temperature information is inputted into the indoor control unit 29. The indoor control unit 29 calculates the degree of superheat on the basis of the inputted entrance and exit temperatures of the evaporator, and controls the opening of the electronic expansion valve 5.

Figure 5:
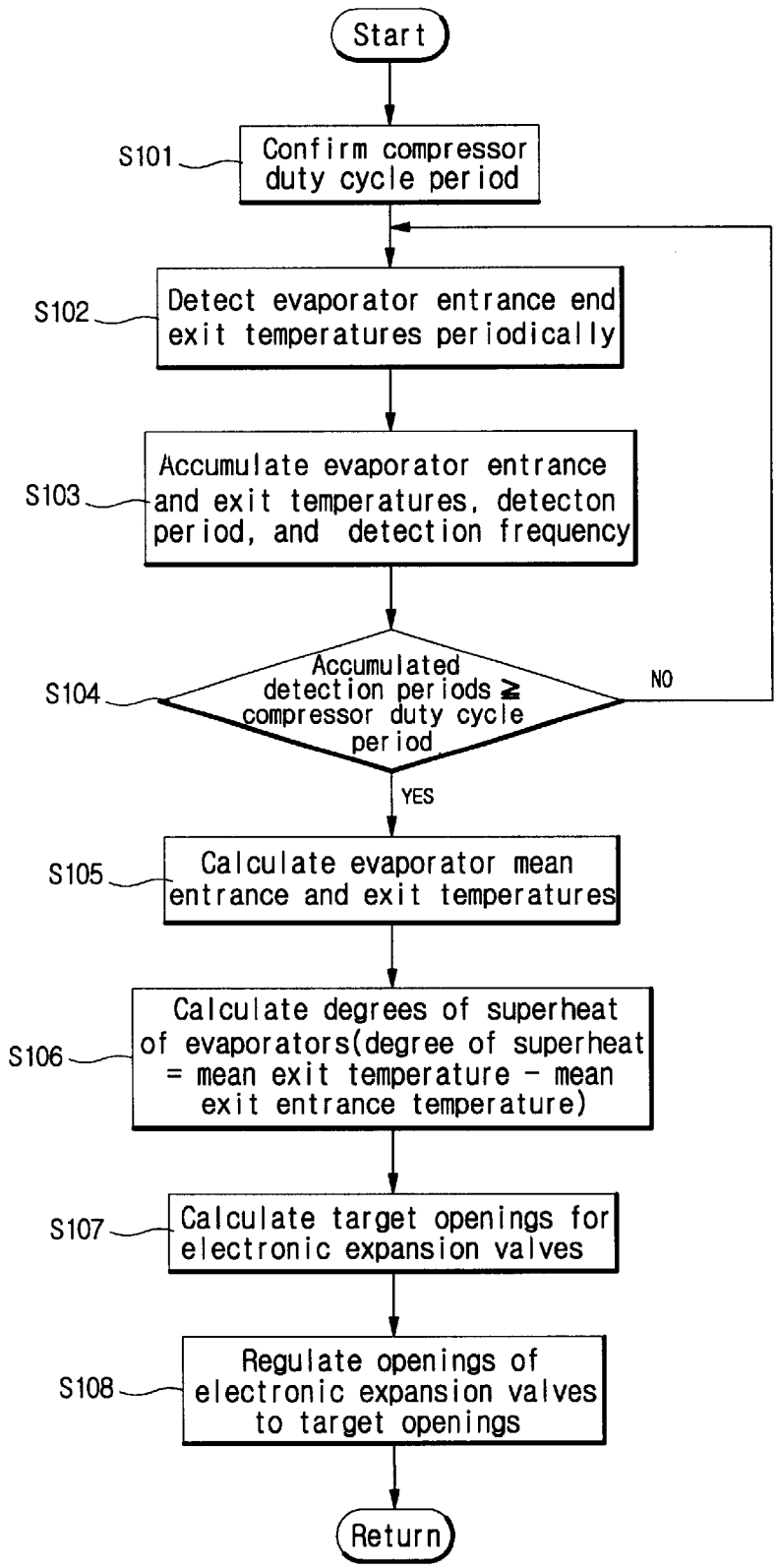
FIG. 5 is a flowchart showing a method for controlling the degree of superheat of an air conditioner in accordance with the present invention.

Referring to FIG. 5, a method for controlling the degree of superheat is described below. First, the period of the PWM valve or the duty cycle period of the compressor 2 is confirmed (S101). The duty cycle period of the compressor 2 is transmitted from the outdoor unit 8 through the outdoor communication unit 28 and the indoor communication unit 32 to the indoor control unit 29. In this embodiment, the period is a preset value, e.g., 20 seconds. Subsequently, the entrance and exit temperatures of the evaporators 5 are periodically or continuously detected (S102). The entrance temperatures of the evaporators 5 are detected by the evaporator entrance temperature sensors 30, and the exit temperatures of the evaporators 5 are detected by the evaporator exit temperature sensors 31. The indoor control unit 29 accumulates the detected entrance and exit temperatures of the evaporators 5 and detection periods, and counts a detection frequency (S103).

Thereafter, each indoor control unit 29 determines whether accumulated detection periods are identical with or exceed the duty cycle period of the compressor 2 (S104). If not, the above described steps are repeated. If the accumulated detection periods are greater than or equal to the duty cycle, mean entrance and exit temperatures are calculated using accumulated entrance and exit temperatures and the counted detection frequency. In essence, when the control of the degree of superheat starts, the indoor control unit 29 confirms the duty cycle period and calculates the mean entrance and exit temperatures. In an embodiment, the loading time of the compressor 2 may be employed instead of the duty cycle period of the compressor. In such a case, the loading time information is transmitted from the outdoor unit 8.

Thereafter, the degree of superheat is calculated (S106). The degree of superheat utilized in this embodiment is a value obtained by subtracting the mean entrance temperature of the evaporator from the mean exit temperature of the evaporator. When the degree of superheat is calculated, a preset target opening value of the electronic expansion valve 4 is calculated on the basis of the degree of superheat and the opening of the electronic expansion valve 4 is regulated to the calculated target opening value (S108). In this case, the target opening value is set to be small when the degree of superheat is high, whereas the target opening value is set to be large when the degree of superheat is low.

Figure 6:
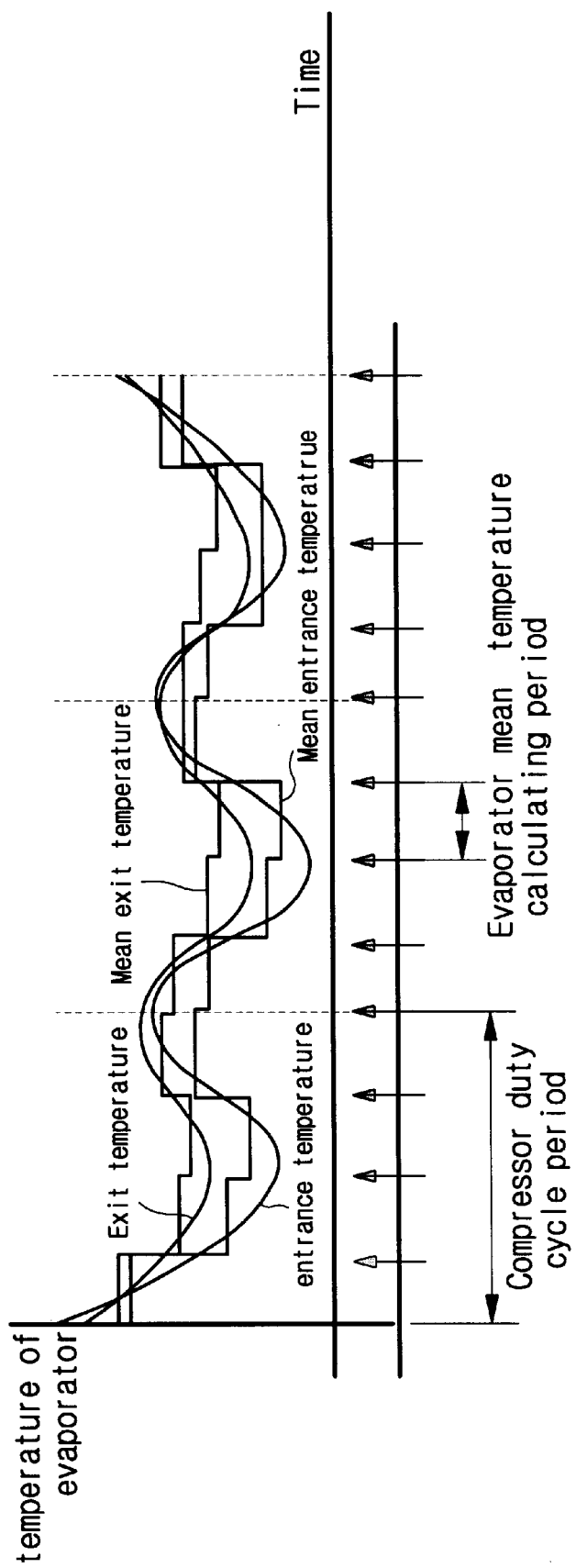
FIG. 6 is a graph showing variations in the entrance and exit temperatures of an evaporator when the duty cycle period of the compressor is different from the period for calculating the mean temperatures of the evaporator in the air conditioner of the present invention.
Figure 7:
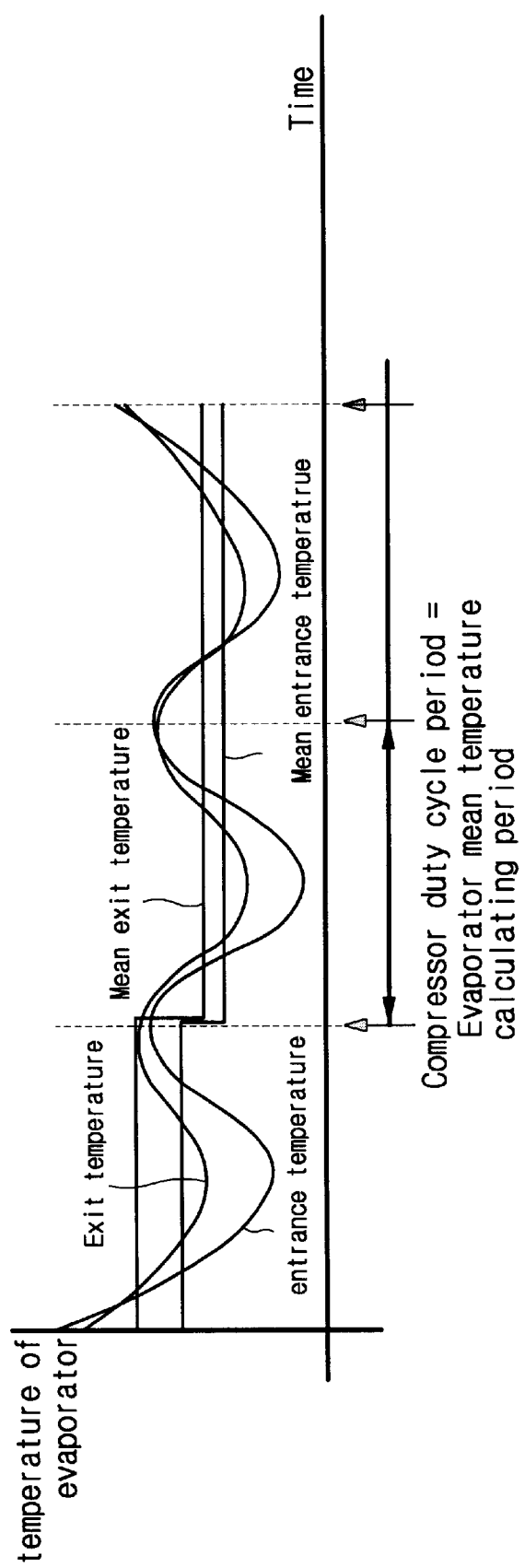
FIG. 7 is a graph showing variations in the entrance and exit temperatures of an evaporator when the duty cycle period of the compressor is same as the period for calculating the mean temperatures of the evaporator in the air conditioner of the present invention.
Figure 8:
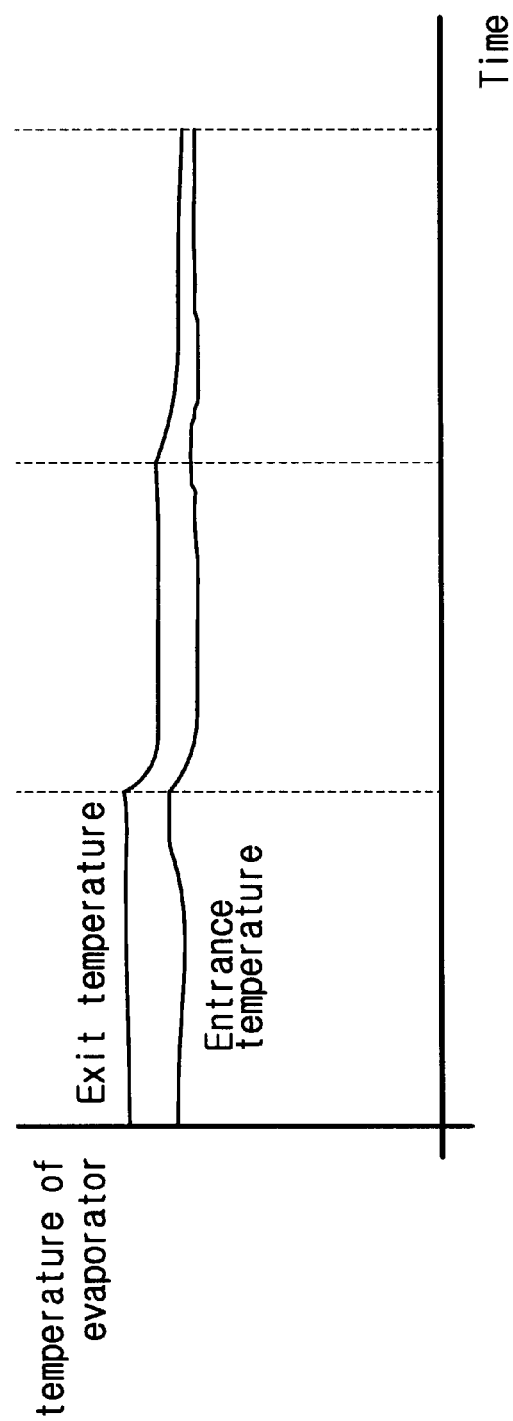
FIG. 8 is a graph showing variations in the entrance and exit temperatures of a conventional multi-air conditioner.

The reason why the mean entrance and exit temperatures of the evaporator 5 are employed to calculate the degree of superheat of the evaporator is to compensate for a temperature fluctuation phenomenon caused by the fact that in a pulse width modulated compressor the discharge of refrigerant intermittently occurs even when the compressor is operated. As shown in FIGS. 6 and 7, since the difference between the entrance and exit temperatures of the evaporator always varies while the pulse width modulated compressor is employed, the degree of superheat calculated using the entrance and exit temperatures of the evaporator at a certain instance may deviate from the actual degree of superheat. When an accumulated time for mean temperature detection is different from the period of the PWM valve or the duty cycle of the compressor 2 as shown in FIG. 6 even though mean temperatures are utilized, the calculated degree of superheat is likely different from the actual degree of superheat because the difference between the mean entrance and exit temperatures varies. On the contrary, when an accumulated time for mean temperature detection is identical with the duty cycle of the compressor 2 as shown in FIG. 7, the calculated degree of superheat is mostly same as the actual degree of superheat because the difference between the mean entrance and exit temperatures is substantially constant, thereby properly controlling the degree of superheat.

INDUSTRIAL APPLICABILITY

As described above, the present invention provides a system and method for controlling the degree of superheat, in which the degree of superheat is controlled using the entrance and exit temperatures of each evaporator and the mean entrance and exit temperatures of the evaporator calculated for a period of time identical with the duty cycle period of the compressor are utilized for the calculation of the degree of superheat, thereby compensating for a temperature fluctuation phenomenon. As a result, the degree of superheat corresponding to the actual degree of superheat can be calculated and the opening of each electronic expansion valve can be regulated on the basis of the above described degree of superheat, thereby optimizing an air conditioning system.

What is claimed is:

1. A system to control the degree of superheat of an air conditioner, comprising:

a compressor controlled in a pulse width modulation manner according to duty control signals;

a condenser, an electronic expansion valve and an evaporator constituting a refrigeration cycle together with said compressor;

means for sensing properties to calculate the degree of superheat of said evaporator; and a control unit to regulate opening of said electronic expansion valve according to the calculated degree of superheat;

wherein said property sensing means includes an entrance temperature sensor situated at the entrance of said evaporator and an exit temperature sensor situated at the exit of said evaporator, and said degree of superheat is determined by the difference between mean entrance and exit temperatures of said evaporator sensed by said entrance temperature sensor and said exit temperature sensor for a period of time corresponding to a duty cycle period of said compressor.

2. The system according to claim 1, wherein said mean entrance and exit temperatures are mean values of temperatures measured for a period of time identical with a duty cycle period of said compressor.

3. A system to control the degree of superheat of an air conditioner, comprising:

a compressor controlled in a pulse width modulation manner according to duty control signals;

a condenser, an electronic expansion valve and an evaporator constituting a refrigeration cycle together with said compressor;

means for sensing properties to calculate the degree of superheat of said evaporator; and a control unit to regulate opening of said electronic expansion valve according to the calculated degree of superheat;

wherein said property sensing means includes an entrance temperature sensor situated at the entrance of said evaporator and an exit temperature sensor situated at the exit of said evaporator, and said degree of superheat is determined by the difference between mean entrance and exit temperatures of said evaporator sensed by said entrance temperature sensor and said exit temperature sensor for a loading time of said compressor.

4. The system according to claim 1, wherein said compressor and said condenser constitute an outdoor unit, said electronic expansion valve and said evaporator constitute an indoor unit, and said system comprises a plurality of indoor units arranged in parallel.

5. A method of controlling the degree of superheat of an air conditioner, said air conditioner including a compressor controlled in a pulse width modulation manner according to duty control signals, an electronic expansion valve and an evaporator, comprising:

detecting entrance and exit temperatures of said evaporator;

calculating the degree of superheat on the basis of detected entrance and exit temperatures;

calculating a target opening value of said electronic expansion valve on the basis of the calculated degree of superheat; and regulating said electronic expansion valve to a calculated target opening value;

wherein said entrance and exit temperatures are mean entrance and exit temperatures of said evaporator sensed by said entrance temperature sensor and said exit temperature sensor for a period of time corresponding to a duty cycle period of said compressor.

6. A method of controlling the degree of superheat of an air conditioner, said air conditioner including a compressor controlled in a pulse width modulation manner according to duty control signals, an electronic expansion valve and an evaporator, comprising:

detecting entrance and exit temperatures of said evaporator;

calculating the degree of superheat on the basis of detected entrance and exit temperatures;

calculating a target opening value of said electronic expansion valve on the basis of the calculated degree of superheat; and regulating said electronic expansion valve to a calculated target opening value;

wherein said entrance and exit temperatures are mean entrance and exit temperatures of said evaporator sensed by said entrance temperature sensor and said exit temperature sensor for a loading time of said compressor.

* * * * *